No. 745,371. PATENTED DEC. 1, 1903.
D. D. NOFZIGER.
GRAIN SEPARATOR FOR THRESHING MACHINES.
APPLICATION FILED JUNE 22, 1901.
NO MODEL.

Witnesses
D. D. Nofziger Inventor
by
Attorneys

No. 745,371.   Patented December 1, 1903.

UNITED STATES PATENT OFFICE.

DANIEL D. NOFZIGER, OF ARCHBOLD, OHIO.

GRAIN-SEPARATOR FOR THRESHING-MACHINES.

SPECIFICATION forming part of Letters Patent No. 745,371, dated December 1, 1903.

Application filed June 22, 1901. Serial No. 65,662. (No model.)

*To all whom it may concern:*

Be it known that I, DANIEL D. NOFZIGER, a citizen of the United States, residing at Archbold, in the county of Fulton and State of Ohio, have invented a new and useful Grain-Separator for Threshing-Machines, of which the following is a specification.

My invention is an improved grain-separator for threshing-machines; and it consists in the peculiar construction and combination of devices hereinafter fully set forth and claimed.

Figure 1:
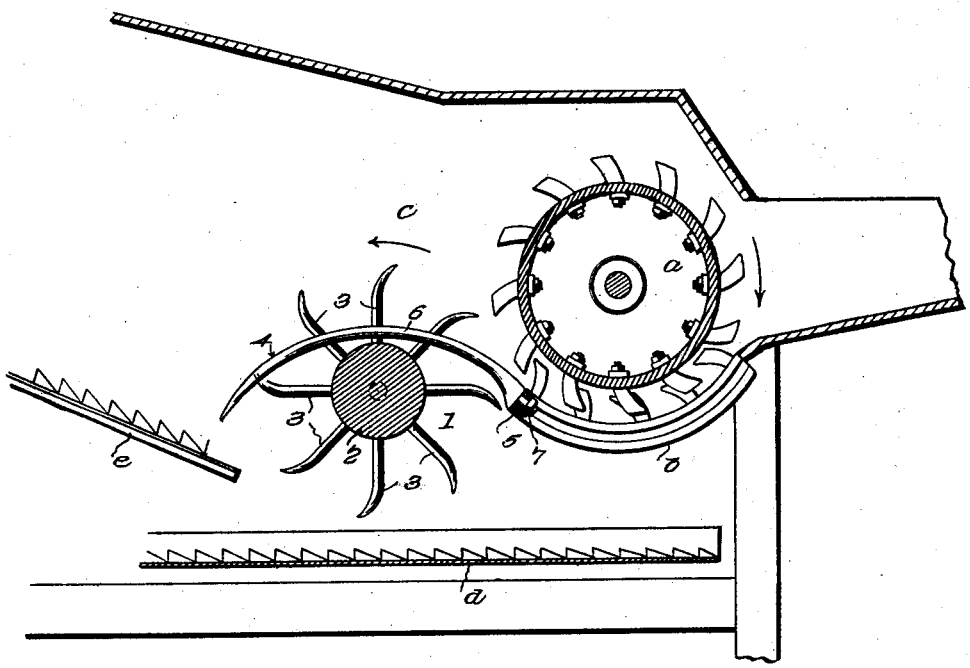
Figure 2:
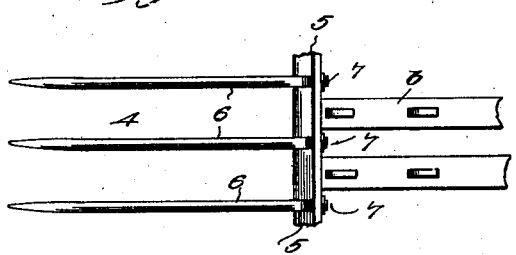

In the accompanying drawings, Figure 1 is a vertical longitudinal sectional view of a portion of a threshing-machine provided with my improved grain-separator. Fig. 2 is a detail top plan view of a portion of my separating-grate and of the concave, to the rear side of which it is attached.

In the embodiment of my invention I provide a revoluble beater and picker 1, which is located in rear of the usual threshing-cylinder *a* and concave *b*. The said revoluble picker and beater comprises a cylindrical drum, which has its bearings in the usual casing *c* and is rotated by any suitable means, and picker-arms 3, which are secured to and radiate from said cylindrical drum. It will be observed by reference to the drawings that the said revoluble picker and beater is above the front portion of the usual grain-pan *d* and immediately in advance of the usual reciprocating straw-rack *e*.

In combination with the revoluble picker and beater I employ a separating-grate 4, which comprises a plate 5, bolted to the rear side of the concave *b*, and a series of curved grate-bars 6, which are disposed over the drum of the revoluble picker and beater, said revoluble picker and beater being mounted below the highest point of the said curved grate-bars and above the axis of the curve of said bars, so that the greater portion of the arms of said picker and beater shall protrude centrally above said curved grate-bars, which latter are naturally disposed between the radial picker arms or teeth 3, so that said picker arms or teeth are intercurrent with said grate-bars. The latter, it will be observed, are curved reversely to the curvature of the concave and to an extent not exceeding the curvature of the latter, of which the said grate-bars form a direct continuation. By this construction the said grate-bars will in no sense act to intercept the passage of the straw as it comes from between the cylinder and the concave; but they will simply form a very gradual inclined plane over which the straw will be naturally guided by the action of the revoluble picker and beater. The front ends of the grate-bars are bolted to the plate 5, as at 7; otherwise the said grate-bars are entirely disconnected from each other, and the spaces between them are open at their rear ends. It will be observed that the rear ends of the curved grate-bars are disposed above the front end of the straw-rack. The direction of rotation of the revoluble picker and beater is indicated by the arrow in Fig. 1, and it will be understood that the said revoluble picker and beater project through the spaces between the grate-bars nearly to the threshing-cylinder and engage by extending through the straw as it is discharged from between the cylinder and concave, the grate and the beater coacting to separate the threshed grain from the straw, the said picker-arms serving to shake and carry the straw and in clearing the latter at the open spaces between the rear ends of the grate-bars to act centrifugally in throwing the straw downwardly upon the straw-rack, which is below and behind the grate and in practice about sixteen inches therefrom. By thus throwing the straw upon the straw-rack such grain as remains in the straw is dislodged therefrom.

My improved separating-grate and revoluble picker and beater may be attached to and operated in connection with any grain-separator and threshing-machine of usual form. Owing to the curvature of the separating-grate, bunches of damp grain, which have a tendency to cling together, are retarded in their movement rearwardly from the threshing mechanism, and the revoluble picker and beater is efficient in effecting a thorough separation of the straw and of the dislodgment of the threshed grain therefrom. It will be understood that the teeth of the revoluble picker and beater as they pass rearwardly between and under the bars of the separating-grate serve to toss the straw upwardly as it is discharged from the threshing mechanism, the separating-grate catching the straw as it falls and the revoluble picker and beater serving to move the threshed straw rearwardly from the threshing mechanism to the straw-rack while tossing and separating the straw and effecting the separation and dislodgment of the threshed grain therefrom.

The centrifugal action of the revoluble picker and beater, to which reference has hereinbefore been made and which naturally results from its operation at a considerable rate of speed, will make itself felt particularly at the point where the arms of said revoluble picker and beater become disengaged from the straw. It will be seen that the picker-arms, which extend so closely to the concave and cylinder as to merely be able to clear the teeth of the latter, will engage the straw at the very moment it passes from between the cylinder and concave. The engagement between the picker-fingers and the straw becomes more intimate as the straw progresses over the slight curvature or incline of the grate-bars; but as the straw is swept forcibly in a rearward direction at the moment of its disengagement from the picker-arms it will be tossed violently in a rearward direction upon the straw-carrier, and the centrifugal action being most violently exerted at the extremities of the picker-arms, what may be termed the "upper" layer of the straw will be tossed farthest and most violently, while the under layer is less violently agitated or acted upon. This very difference tends to rend asunder the interwoven straw, thereby facilitating the dislodgment and separation of the grain.

Having thus described my invention, I claim—

1. The combination with the cylinder and concave and straw-carrier of a threshing-machine, of a cross-bar at the rear end of said concave, a plurality of grate-bars bolted to said cross-bar, said grate-bars being curved reversely to the curvature of the concave forming a direct continuation of the same and terminating above the front end of the straw-carrier and a revoluble picker and beater mounted below the highest point of the curved grate-bars and having arms, intercurrent with the latter and of a length to nearly meet the teeth of the cylinder.

2. The combination with the cylinder and concave and straw-carrier of a threshing-machine, of a cross-bar at the rear end of said concave, a plurality of grate-bars bolted to said cross-bar, said grate-bars being curved reversely to the curvature of the concave, forming a direct continuation of the same and terminating above the front end of the straw-carrier, and a revoluble picker and beater mounted below the highest point of the curved grate-bars and above the axis of the curve of said bars and having arms intercurrent with the latter and of a length to nearly meet the teeth of the cylinder.

In testimony that I claim the foregoing as my own I have hereto affixed my signature in the presence of two witnesses.

DANIEL D. NOFZIGER.

Witnesses:
JOHN W. LAUBER,
AUGUST RINKLEY.